Patented Dec. 12, 1950

2,534,099

UNITED STATES PATENT OFFICE 2,534,099

HERBICIDAL COMPOSITIONS

Chester L. Arnold, Berkeley, Calif., assignor to Stauffer Chemical Company, a corporation of California No Drawing. Application May 6, 1949, Serial No. 91,880

8 Claims. (Cl. 71—2.7)

This invention relates to the prevention and destruction of weeds and to the defoliation of useful plants.

I have found that perchloro-methyl-mercaptan has useful properties as an herbicide on noxious plants and a defoliant on useful plants as well as having soil sterilizing and fungicidal properties. This material can be made by reacting chlorine and carbon bisulphide in the presence of iodine and diffused light (see Helfrich and Reed, J. A. C. S. (1921) 43, page 591); the reaction mixture contains perchloro-methyl-mercaptan (also known as trichloromethanesulfenyl chloride or perchloro-mercaptan or thiocarbonyl perchloride, $CSCl_4$), sulfur chloride ($S_2Cl_2$), together with some carbon tetrachloride and unreacted carbon bisulphide. The crude mixture can be utilized as such or it can be separated into fractions containing perchloro-methyl-mercaptan. For example, in one instance I separated the crude reaction mixture into two fractions, one distilling over at a temperature below 140° C., and the other distilling over at a temperature above 140° C.; each of these fractions had herbicidal and defoliating properties due to the presence of perchloro-methyl-mercaptan and any fraction of the crude reaction product is useful so long as it contains perchloro-methyl-mercaptan. The concentration of perchloro - methyl - mercaptan should be about 0.5% or more to be effective, the upper limit being generally determined by the total cost involved, that is, the cost of the material and the cost of application.

The materials of the present invention can be utilized in water emulsion with a suitable wetting, dispersing and emulsifying agent, or they can be placed upon a suitable inert carrier and this can be employed as such as a dry dust or suspended in water and then sprayed.

Because of the reactive nature of the material, it is necessary to use care in selecting the wetting, dispersing and emulsifying agent; as suitable wetting, dispersing and emulsifying agents I have used Triton X-100, an alkyl polyethylene glycol ether made by Rohm & Haas, and Tenlo-10, a polyhydroxy alcohol fatty acid ester made by Griffin Chemical Company of San Francisco, California. I have had success in formulating an emulsifiable mixture using the material of the present invention, an oil and a small quantity of the wetting agent, mixing these in the proportions of about 50, 40 and 10 parts by weight, and adding the emulsifying agent last. One can also proceed by mixing the material and a suitable wetting agent, the proportions of about 4 to 1 generally being suitable. The oil may have herbicidal properties although this is not necessary.

As indicative of the herbicidal utility of the material, a water emulsion of perchloro-methyl-mercaptan containing 1% of the latter, sprayed upon growing chick-weed, killed this within two days, a control plot being unaffected at the end of the same period.

A water emulsion containing 5% of the crude reaction mixture effectively destroyed dandelions, while other dandelions in an untreated but adjacent area remained unaffected.

Application of a water emulsion containing 5% of the reaction mixture caused defoliation of growing cotton, tomato and potato plants while control plants retained their leaves.

A mixture containing 80 parts by weight of perchloro-methyl-mercaptan, 15 parts by weight of a petroleum oil solvent and 5 parts of Triton X-100 was emulsified in water to provide a concentration of 1% of the perchloro-methyl-mercaptan. Chick-weed sprayed with the emulsion was destroyed while a control test plot was unaffected.

A mixture, made up of 50 parts of perchloro-methyl-mercaptan and 40 parts of CD-1, an aromatic weed oil, marketed by Shell Oil Co. and 10 parts of Triton X-100, was emulsified to a 5% concentration of the perchloro-methyl-mercaptan. When applied to dandelions, a complete kill was effected and regrowth did not occur while controls were not affected.

A mixture made up of 80 parts of perchloro-methyl-mercaptan and 20 parts of Triton X-100 was emulsified to provide a 5% perchloro-methyl-mercaptan concentration; this gave a complete kill of purslane while a control plot remained unaffected.

A wettable powder was made up by applying 25 parts of perchloro-methyl-mercaptan and 12½ parts of Triton X-100 on 62½ parts of a finely divided clay. This was then dispersed in water so as to provide a 1% concentration of perchloro-methyl-mercaptan. When applied to pinto bean plants, these were destroyed within two days, a control plot being unaffected.

This powder was also applied as a dry dust to cotton plants grown in a profusion simulating rank field growth. Within a few days, the leaves withered with the formation of an abcission layer. The relatively heavy dust settles through the rank foliage, releasing the chlorinated product which rises to effect the desired defoliation.

I claim:

1. A composition for killing weeds and defoliating plants, said composition containing perchloro-methyl-mercaptan as an active ingredient in an effective concentration, water and a wetting, dispersing and emulsifying agent.

2. A composition for killing weeds and defoliating plants, said composition containing perchloro-methyl-mercaptan in an effective concentration of at least 0.5% by weight as an active ingredient, water and a wetting, dispersing and emulsifying agent.

3. A composition containing perchloro-methyl-mercaptan as a phytotoxic substance and mixed with a wetting, dispersing and emulsifying agent and comprising at least 1% of the composition, said composition being capable of being mixed with water to form a mixture containing at least 1% by weight of said perchloro-methyl-mercaptan and having herbicidal and defoliating properties.

4. A method of killing weeds which consists in applying to the weeds the reaction product of carbon bisulfide and chlorine and containing perchloro-methyl-mercaptan.

5. A method of killing weeds which consists in applying to the weeds perchloro-methyl-mercaptan.

6. A method of defoliating a plant such as cotton comprising applying perchloro-methyl-mercaptan as a phytotoxic substance to a mature plant, the concentration and amount of the perchloro-methyl-mercaptan being such as to exert an herbicidal action on the cotton leaves but not on the plant stems.

7. A phytotoxic composition comprising an aqueous emulsion containing at least 0.5% by weight of perchloro-methyl-mercaptan.

8. A phytotoxic composition comprising a powder and at least 0.5% by weight of perchloro-methyl-mercaptan.

CHESTER L. ARNOLD.

REFERENCES CITED

The following references are of record in the file of this patent:

J. American Chem. Society (1921), vol. 43, pages 591 to 594.